Jan. 31, 1967     J. W. QUALMAN ET AL     3,300,971
PRELOADED TORQUE CONVERTER
Filed June 1, 1965     2 Sheets-Sheet 1

INVENTORS
Jack W. Qualman &
BY Earl L. Egbert

Robert L. Spencer
ATTORNEY

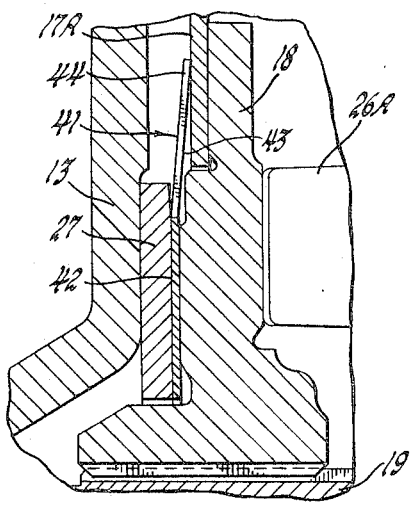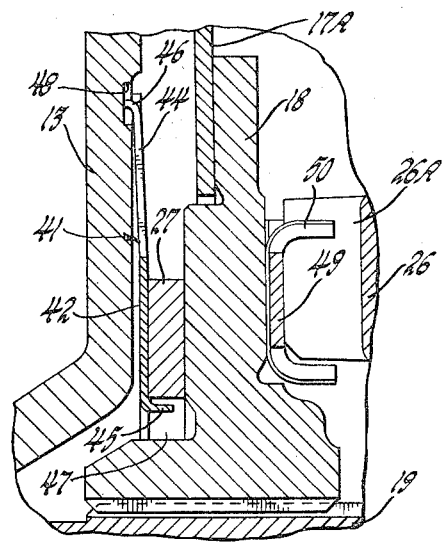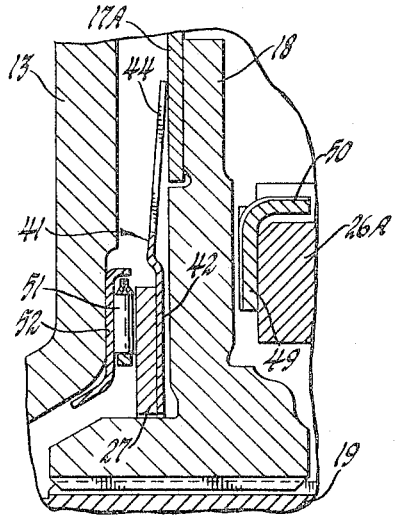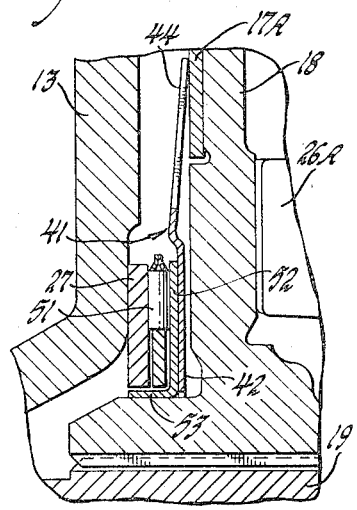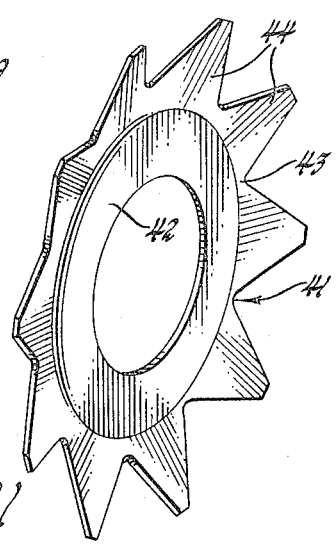

United States Patent Office 3,300,971
Patented Jan. 31, 1967

3,300,971
PRELOADED TORQUE CONVERTER
Jack W. Qualman, Ann Arbor, and Earl L. Egbert, Northville, Mich., assignors to General Motors Corporation, Detroit, Mich., a corporation of Delaware
Filed June 1, 1965, Ser. No. 460,222
13 Claims. (Cl. 60—54)

This invention relates to hydrodynamic torque transmitting devices and more particularly to a hydraulic torque converter constructed and arranged to reduce converter bumping noise or "clunk" frequently present in such structures and to reduce thrust loading normally transmitted to the engine crankshaft and crankshaft bearings.

An object of this invention is to provide an improved hydraulic torque converter provided with means for minimizing internal shock normally present in such structures and arising as a result of turbine end play or travel.

Another object of this invention is to provide a hydraulic torque converter incorporating means for reducing the axial thrust loading transmitted to the crankshaft by which the converter is driven and to thereby reduce thrust wear of the crankshaft bearings.

A further object of this invention is to provide yieldable preloaded spring means between the turbine and impeller cover whereby a preloaded axial thrust is applied to the converter turbine, converter reaction member and impeller cover tending to maintain the turbine in axial spaced relationship with respect to the impeller cover.

A more specific object of this invention is to provide a simple inexpensive preloaded spring for biasing the converter turbine hub, the inner race of the converter stator or reaction member and impeller rearwardly in the converter assembly and in spaced relationship with respect to the converter cover.

A further object of this invention is to provide means for applying an axial thrust to the converter turbine, converter stator and impeller tending to bias these members rearwardly in the assembly and permitting different speeds of rotation of these elements while maintaining a preloaded axial force on all of these elements.

These and other objects of this invention will be apparent from the following description and claims, taken in conjunction with the accompanying drawings, in which:

FIGURE 7 is a longitudinal sectional view through a converter similar to FIGURE 1 and illustrating a modified form of Belleville washer in the assembly.

FIGURE 8 is a longitudinal sectional view through a portion of a converter and illustrating a further modified preloaded spring which drives the thrust washer at converter impeller speed of rotation.

FIGURE 9 is a longitudinal sectional view through a portion of the converter and illustrating an anti-friction bearing disposed between the converter cover and thrust washer.

FIGURE 10 is a longitudinal section through a portion of a converter and illustrating the bearing disposed intermediate the thrust washer and preloaded spring.

FIGURE 11 is a perspective view of a preloaded spring of the type adapted for use in the modifications illustrated in FIGURES 7 through 10.

Figure 1:
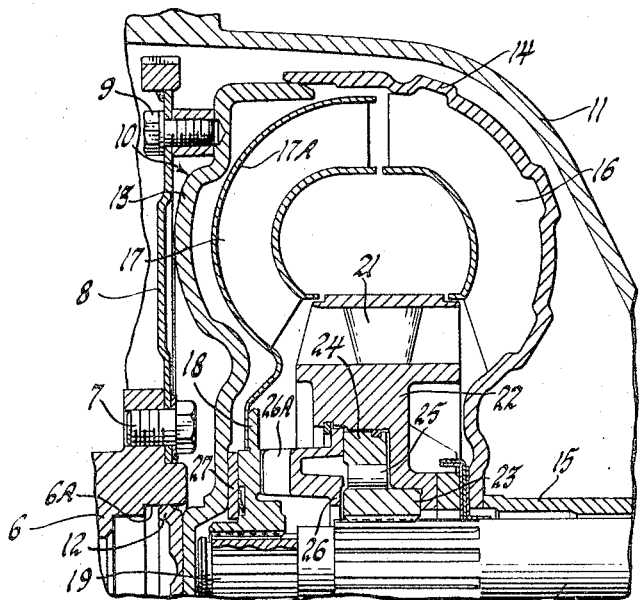
FIGURE 1 is a longitudinal section through a torque converter constructed in accordance with the principles of this invention and to which any one of the various spring modifications of FIGURES 2 through 10 may be applied.

Referring to FIGURE 1, there is shown a hydrodynamic torque transmitting device in the form of a hydraulic torque converter indicated generally at 10. Converter 10 is disposed within a fixed housing 11 and includes a rotatable cover 13 bolted to a flexible drive plate 8 by bolts 9. An adapter 6 driven by an engine crankshaft (not shown) is bolted to plate 8 by bolts 7. A bearing 12 carried by cover 13 fits into a recess 6A in adapter 6 to rotatably support cover 13 in the adapter and to allow axial motion of the cover relative to the adapter.

An impeller housing 14 welded to the cover and driven by cover 13 is rotatably supported by means of a sleeve shaft 15 which may drive a pump (not shown) for supplying fluid under pressure for transmission control and lubrication purposes. A series of impeller blades 16 are driven by housing 14. A series of turbine blades 17 are supported upon a drum 17A connected to a turbine hub 18 splined to a power delivery shaft 19. Shaft 19 extends through a hollow sleeve reaction shaft 20 fixed against rotation. A plurality of reaction blades 21 are carried by a reaction hub 22 adapted to rotate forwardly in the direction of rotation of impeller blades 16. A one-way brake for preventing reverse rotation of hub 22 includes a race 23 splined to shaft 20, a race 24 fixed for rotation with hub 22 and a series of roller brakes 25 disposed between races 23 and 24. A retainer 26 fixed to hub 22 maintains rollers 25 in the space between races 23 and 24 and is provided with an axially extending stop member 26A for contacting the surface of hub 18 adjacent retainer 26.

Figures 2, 3, 4:
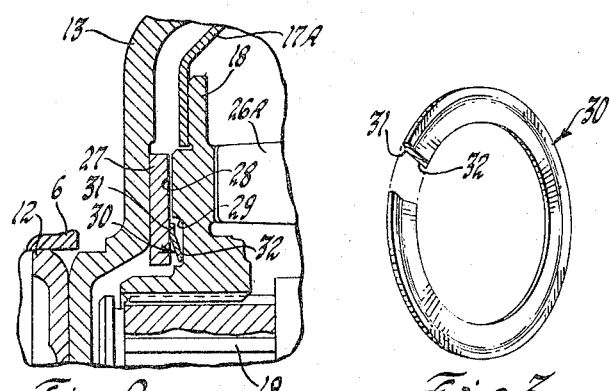
FIGURE 2 is an enlarged view of a portion of FIGURE 1 illustrating a Belleville spring for applying a preloaded axial thrust to the turbine hub.
FIGURE 3 is a perspective view of the Belleville spring shown in FIGURE 2.
FIGURE 4 is a longitudinal sectional view through a portion of a converter similar to FIGURE 1 and provided with a wave-washer spring.

As shown in FIGURES 1 and 2, a thrust washer 27 is disposed between impeller drive cover 13 and turbine hub 18. In conventional structures, turbine hub 18, which is splined to shaft 19, tends to move axially relative to shaft 19 and to establish contact between a raised annular boss 28 on hub 18 and washer 27. This converter end play is built in and is inherent in conventional structures. This end play results in a shock which is audible as a clunk and particularly occurs upon a reversal of torque such as happens when the turbine goes from a drive condition of operation to a coast condition of operation and from coast to drive. In order to eliminate or reduce this shock loading and consequent noise or clunk, and to reduce the shock loading taken through adapter 6 to the engine crankshaft bearings, means are provided to preload the turbine hub axially in a direction away from thrust washer 27 and towards reactor hub 22.

In FIGURES 1 and 2, turbine hub 18 is provided with an annular pocket 29 (best shown in FIGURE 2) adapted to receive a Belleville spring 30. Spring 30 seats upon the base pocket 29 and upon thrust washer 27 and in the assembly maintains a preloaded axial thrust upon hub 18 tending to maintain boss 28 and thrust washer 27 in spaced relationship and to maintain hub 18 in contact with stop member 26A on retainer 26. As best shown in FIGURE 3, Belleville spring 30 is shaped to provide an upstanding surface 31 adapted to contact thrust washer 27 and an arm 32 permanently bent at an angle to surface 31. The inner edge or rim of annular arm 32 bears against the base of pocket 29.

Figure 5:
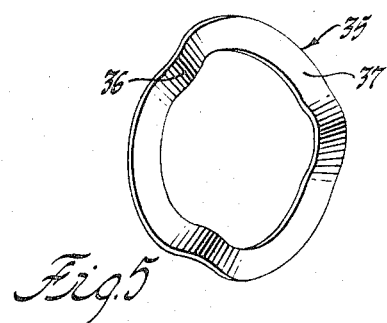
FIGURE 5 is a perspective view of the wave-washer spring shown in FIGURE 4.

In FIGURE 4, similar numbers are used to denote parts similar to those of FIGURES 1 and 2, the flexible plate 8 of FIGURES 1 and 2 not being shown. In FIG- URE 4, a wave-washer spring 35 (best shown in detail in FIGURE 5) is disposed in pocket 29 in place of Belleville spring 30 of FIGURES 1 and 2. The structures are otherwise the same as FIGURES 1 and 2. As best shown in FIGURE 5, spring 35 is shaped to provide three equally spaced offset raised portions 36 joined by three equally spaced flat surfaces 37 lying in a common plane. In the assembly in FIGURE 4, the permanently offset raised portions 36 contact the base of annular pocket 29 of hub 18 and the coplanar flat surfaces 37 contact a spacer 38 disposed between wave washer 35 and thrust washer 27. Annular washer 35 asserts a preloaded axial thrust on hub 18 forcing the hub into contact with stop 26A and into spaced relationship with respect to spacer 38 and thrust washer 27.

Figure 6:
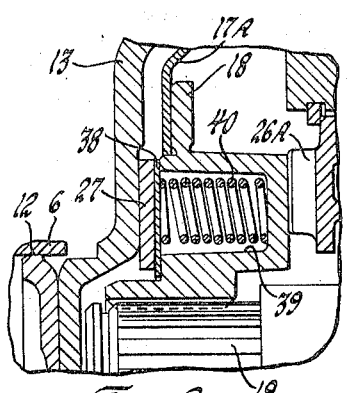
FIGURE 6 is a longitudinal sectional view through a converter similar to FIGURE 1 and illustrating one of a plurality of preloaded coil springs carried by the turbine hub.

In FIGURE 6 there is shown a third modified spring arrangement wherein turbine hub 18 has formed therein a plurality of equally spaced elongated pockets 39 (one being shown) rather than a single annular pocket 29 as shown in FIGURES 2 and 4. Each individual pocket 39 has inserted therein a coil spring 40 having one end seated upon the base of pocket 39 and the opposite end seated upon a washer 38. Springs 40 assert a preloaded force on hub 18 biasing the hub into contact with stop 26A and into spaced relationship with respect to thrust washer 27 and washer 28.

Referring to FIGURE 7, a modified biasing washer indicated generally at 41 is disposed between thrust washer 27 and hub 18 to bias the hub into contact with stop member 26A. As best shown in FIGURE 11, spring washer 41 is shaped to provide a flat annular bearing surface 42 and a permanently offset surface 43 having a plurality of contact fingers 44 formed in the outer peripheral portion of surface 43. As best shown in FIGURE 7, fingers 44 extend outwardly and axially to contact turbine blade support drum 17A. The washer 41 is particularly useful in applications where relatively high axial thrust is required and provide an inexpensive washer for producing such relatively high axial thrust.

In FIGURE 8 the spring washer 41 is modified to provide an axially extending finger 45 on surface 42 and to provide an axially extending finger 46 on the tip of at least some of the fingers 44. Spring washer 41 is disposed between cover 13 and thrust washer 27 with axial finger 45 extending into a recess 47 in washer 27 and finger 46 extending into a recess 48 formed in cover 13. Thus, while washer 27 is normally spaced from cover 13 the washer 27 is driven at the speed of rotation of cover 13. An additional wear plate 49 is disposed between hub 18 and stop member 26A. Wear plate 49 is provided with axially extending fingers 50 to lock the wear plate to stop member 26A and cover 26.

In FIGURE 9, a bearing 51 is disposed intermediate cover 13 and thrust washer 27. Washer 41 normally assumes a position wherein surface 42 contacts washer 27 and is spaced from hub 18. Due to contact of fingers 44 with drum 17A, spring washer 41 will rotate at the speed of rotation of turbine drum 17A and will drive thrust washer 27 at this speed. In this arrangement wear is greatly reduced with consequent increase in useful life. A wear plate 49 disposed betwen hub 18 and stop member 26A is provided with fingers 50 connecting plate 49 to stop member 26A as in FIGURE 8. Bearing 51 contacts a race 52 rotatable with cover 13 and contacts thrust washer 27.

A further modification is shown in FIGURE 10 wherein thrust washer 27 contacts cover 13. Bearing 51 contacts washer 27 and a bearing race 52 supported on hub 18 by a foot 53 and disposed intermediate bearing 51 and wall 42 of spring 41. Fingers 44 contact turbine drum 17A such that wall 42 is normally out of contact with hub 18 as is true of the FIGURE 9 embodiment. In FIGURE 10, spring washer 41 biases hub 18 into contact with stop member 26A. The FIGURE 10 modification, like that of FIGURE 9 is designed for relatively high axial loading and to assure long useful life.

The various embodiments for spring preloading of the turbine hub have been found by actual test to eliminate the objectionable noise or clunk which is present in converters of conventional design. In conventional converters without preloaded springs a high thrust load can be applied to the crankshaft bearing which reduces the useful life of such bearing. On reversal of torque being transmitted through the converter as occurs when the engine throttle is relaxed to change from drive to coast condition of operation, the side load on the splines of the stator inner race 23 which coacts with the splines of reactor shaft 20 is reduced. The roller brake of the stator free wheels and allows the stator to spin freely. With the spline loading reduced the stator slides forwardly on shaft 20. On reversal of torque input as occurs with the engine throttle open to increase the torque demand, the stator brake locks up and due to loading of inner race 23, the coacting splines on race 23 and shaft 20 lock the inner race in its forward position. A high hydraulic separating force exists at this time between the turbine and cover 13 which thrusts the cover forward (to the left as viewed in the drawings) until the impeller bottoms out on the stator or reaction member, thus deflecting plate 8 to transmit an axial load through plate 8 and adapter 6 to the crankshaft. In the various spring loaded embodiments herein disclosed, the spring load is sufficient to always bias the stator or reactor into the impeller, thereby sliding the stator race 23 towards the rear on stator shaft 20 as the converter balloons despite the side load on the splines between race 23 and shaft 20. This relation is maintained under both drive and coast conditions so that no extra thrust is applied to the crankshaft tending to force the crankshaft in a forward direction. The arrangement thereby reduces thrust wear on the crankshaft bearings and eliminates internal converter bumping noises commonly referred to as converter clunk.

It will readily be understood that the converter is filled with working fluid and that such fluid will lubricate and cool all of the friction contact surfaces. The preloaded springs eliminate converter clunk arising from end play as heretofore described and reduces end thrust normally applied to the engine crankshaft and to the crankshaft bearings.

We claim:

1. In a hydraulic torque converter of the type having an engine driven cover and impeller and having a turbine and a reaction member, a power delivery shaft driven by said turbine, said turbine and reaction member being axially movable with respect to said cover in response to hydraulic forces developed in said converter, preloaded biasing means for biasing said turbine and reaction member into axial spaced relationship with respect to said cover, whereby said turbine is maintained in axially spaced relationship with respect to said cover irrespective of hydraulic forces developed in said converter.

2. In a hydraulic torque converter, an impeller, a turbine, a reaction member disposed between said impeller and turbine, an engine driven cover connected to said impeller for driving said impeller, a power delivery shaft driven by said turbine, said turbine and said reaction member being capable of axial motion with respect to said power delivery shaft in response to hydraulic forces developed in said converter, and a preloaded spring disposed intermediate said turbine and cover applying an axial thrust to said turbine and reaction member for preventing contact of said turbine and cover irrespective of the hydraulic forces developed in said converter.

3. In a hydraulic torque converter of the type having an impeller, turbine and reaction member, an engine driven cover for driving said impeller, means for preventing reverse rotation of said reaction member including a one-way brake having an outer race fixed for rotation with said reaction member, an inner race and a one-way brake disposed between said races, a ground shaft, co-acting splines on said ground shaft and inner race permitting axial motion of said inner race with respect to said ground shaft, a power delivery shaft, a turbine hub splined to said power delivery shaft and axially movable with respect to said shaft, and preloaded spring means for biasing said turbine hub and reaction member rearwardly in said converter whereby said turbine hub is maintained in axial spaced relationship with respect to said cover.

4. In a hydraulic torque converter, an impeller, a turbine, a reaction member disposed between said impeller and turbine, an engine driven cover at the forward end of said converter connected to said impeller for driving said impeller, a power delivery shaft adapted to be driven by said turbine, a turbine hub splined to said power delivery shaft for driving said shaft, said turbine and reaction member being axially movable toward said cover in response to hydraulic forces generated within said turbine, and a preloaded spring disposed between said cover and turbine hub applying an axial thrust to said turbine hub and reaction member biasing said reaction member axially into contact with said impeller and biasing said turbine hub axially into spaced relationship with said cover.

5. In a hydraulic torque converter, an engine driven cover, an impeller driven by said cover, a reaction shaft fixed against rotation, a power delivery shaft, a turbine splined to said power delivery shaft and axially movable with respect thereto, a reaction member disposed between said impeller and turbine, one-way brake means including an outer race fixed to said reaction member, an inner race splined to said reaction shaft and axially movable with respect to said reaction shaft and a brake member disposed between said races, and a preloaded spring for biasing said turbine and said reaction member rearwardly in said converter to maintain said converter turbine in spaced axial relationship with respect to said cover irrespective of reversal of the direction of transmission of torque through said converter.

6. In a hydraulic torque converter of the type having an impeller, a turbine and a reaction member, an engine driven cover for driving said impeller, a power delivery shaft, a turbine hub driven by said turbine and splined to said power delivery shaft, a reaction shaft fixed against rotation, one-way brake means for permitting forward rotation of said reaction shaft and for preventing reverse rotation of said reaction member, said one-way brake means including inner and outer races and a one-way brake disposed between said races, said outer race being rotatable with said reaction member and said inner race being splined to said reaction shaft and axially movable with respect thereto, and preloaded spring means applying an axial thrust to said turbine and said reaction member for biasing said turbine and reaction member rearwardly into contact with said impeller and for maintaining said turbine hub in axial spaced relationship with respect to said cover.

7. In a hydraulic torque converter, an impeller, a turbine, a reaction member disposed between said impeller and turbine, a reaction shaft fixed against rotation, one-way brake means for preventing reverse rotation of said reaction member and for permitting forward rotation of the same, said one-way brake means including an outer race fixed for rotation with said reaction member, an inner race and a one-way brake disposed between said races, splines on said reaction shaft and inner race for preventing rotation of said inner race and permitting axial motion of said inner race with respect to said reaction shaft, a turbine hub driven by said turbine, a power delivery shaft splined to said hub, said hub being axially movable with respect to said power delivery shaft, and a preloaded spring for biasing said turbine hub and reaction member rearwardly into contact with said impeller, said preloaded spring applying an axial thrust to said turbine hub effective to maintain said hub and cover in spaced axial relationship irrespective of the direction in which torque is transmitted through said converter.

8. A torque converter as set forth in claim 4 wherein said preloaded spring comprises a Belleville spring washer.

9. A torque converter as set forth in claim 4 wherein said preloaded spring comprises a wave washer.

10. A torque converter as set forth in claim 4 wherein said preloaded spring comprises a coil spring.

11. A torque converter as set forth in claim 6 including a bearing disposed between said preloaded spring means and said cover for accommodating relative speeds of rotation of said spring means and cover.

12. A torque converter as set forth in claim 6 including a thrust washer disposed between said turbine hub and said cover, said preloaded spring means forming a drive connection between said thrust washer and cover for driving said thrust washer at the speed of rotation of said cover.

13. A torque converter as set forth in claim 6 including a thrust washer disposed between said turbine hub and cover, a bearing between said thrust washer and cover, said preloaded spring means comprising a Belleville type washer having an annular surface disposed axially adjacent said turbine hub and fingers extending outwardly beyond said bearing for contacting said turbine.

References Cited by the Examiner
UNITED STATES PATENTS

| 2,393,470 | 1/1946 | Jandasek | 60—54 |
| 2,481,529 | 9/1949 | Norelius | 60—54 X |

EDGAR W. GEOGHEGAN, *Primary Examiner.*